United States Patent [19]

Lee

[11] Patent Number: 5,791,766
[45] Date of Patent: Aug. 11, 1998

[54] TELESCOPIC LASER POINTER

[76] Inventor: Chih-Jen Lee, 5F, No. 60, Szu-Wei St., Yungho City, Taipei Hsien, Taiwan

[21] Appl. No.: 951,637

[22] Filed: Oct. 16, 1997

[30] Foreign Application Priority Data

| Dec. 4, 1996 | [TW] | Taiwan | 85218698 |
| Jan. 23, 1997 | [TW] | Taiwan | 86201201 |
| Mar. 18, 1997 | [TW] | Taiwan | 86103340 |
| Apr. 7, 1997 | [TW] | Taiwan | 86205263 |
| Jun. 30, 1997 | [TW] | Taiwan | 86210780 |

[51] Int. Cl.$^6$ ............................................. F21K 7/00
[52] U.S. Cl. ............................ 362/259; 362/120; 362/253; 362/285
[58] Field of Search .................... 362/109, 118, 362/119, 120, 253, 259, 285, 418

[56] References Cited

U.S. PATENT DOCUMENTS

| 5,268,829 | 12/1993 | Lo | 362/259 |
| 5,617,304 | 4/1997 | Huang | 362/118 |

*Primary Examiner*—Stephen F. Husar
*Attorney, Agent, or Firm*—Bacon & Thomas

[57] ABSTRACT

The present invention relates to a telescopic laser pointer of the type that includes a telescopic barrel. A laser module is housed within the telescopic barrel. The laser module can be disposed in the front end of the telescopic barrel or within the telescopic barrel. The laser beam generated by the laser module can be suitably directed outward from the front end of the telescopic barrel. A battery is disposed within the telescopic barrel. A switch controls the power supplied from the battery to the laser module.

12 Claims, 7 Drawing Sheets

5,791,766

TELESCOPIC LASER POINTER

FIELD OF THE INVENTION

The present invention relates to a laser pointer, more particularly, to a telescopic laser pointer.

DESCRIPTION OF PRIOR ART

The conventional laser pointer comprises a rigid barrel in which the laser module is housed. The barrel has a pen-like configuration with a length about 5 to 10 centimeters. No doubt the conventional laser pointer has its design advantages and which can indeed project a light spot onto the screen which is away from the speaker. Accordingly, the light spot projected by the laser pointer can suitably and clearly direct the audience. However, the shaking of the hand of the user will directly cause the projected light spot shake also, and this is obviously visible to the audience. If the shaking of the light spot exceeds a certain range, it will cause an uncomfortable feeling to the audience and the above phenomenon is hardly avoidable, and therefore cause a negative influence. Accordingly, many speakers have abandoned the conventional laser pointer.

SUMMARY OF THE INVENTION AND ITS INTENDED OBJECTIVE AND EFFECT

A telescopic laser pointer generally comprises a telescopic barrel defining a front end and a rear end. The telescopic barrel includes a plurality of coaxial tubes, which are connected and enveloped coaxially with each other. The telescopic barrel is similar to the antenna of the radio or wireless telephone. The telescopic barrel can be also made from non-metal material, such as the fishing rod. The outer tube has a larger outer diameter as compared with the inner tube. By this arrangement, those coaxial tubes can be extended or retracted with each other.

A laser module is housed within the telescopic barrel. The laser module can be disposed at the front end of the telescopic barrel or within the barrel. The laser beam generated by the laser module can be projected outward from the front end of the barrel. The barrel is further provided with a battery which is used to supply the operating power to laser module. A switch controls the power supplied to the laser module.

The objective of this invention is to provide an extended laser pointer with which the user can use it to direct the audience through the speech. Since the length of the laser pointer can be suitably adjusted, the speaker can suitably attract the attention of the audience. Besides, the extended laser pointer can be suitably direct the attention of the user toward the target which the speaker is now mentioned.

When the telescopic tubes are completely retracted, it can be used the conventional laser pointer.

When the telescopic laser pointer is extended and the power is not triggered on, it functions as a normal pointing stick.

The present invention may really increase the utility of the laser pointer.

BRIEF DESCRIPTION OF DRAWINGS

In order that the present invention may more readily be understood the following description is given, merely by way of example with reference to the accompanying drawings, in which.

DETAILED DESCRIPTION OF PREFERRED EMBODIMENT

Figure 1:
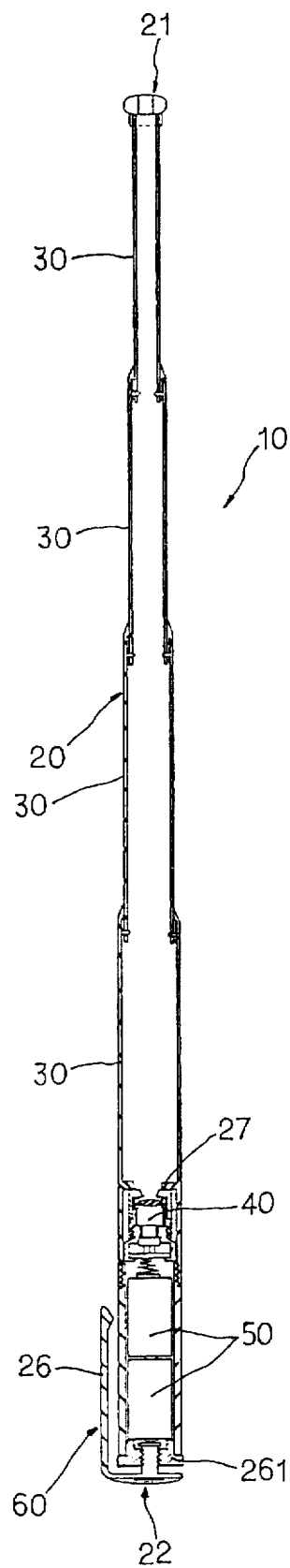
FIGS. 1 and 2 are the cross sectional views of the first embodiment of the telescopic laser pointer which are located at extended and retracted positions, respectively.
Figure 2:
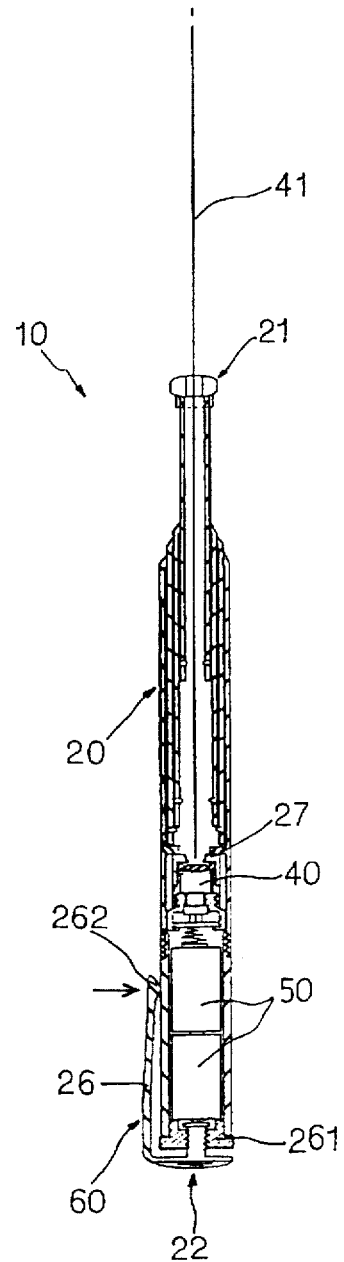

Referring to FIGS. 1 and 2, the first embodiment of the telescopic laser pointer generally comprises a telescopic barrel 20 defining a front end 21 and a rear end 22. The telescopic barrel 20 includes a plurality of coaxial tubes 30, which are connected and enveloped coaxially with each other. The telescopic barrel 20 is similar to the antenna of the radio or wireless telephone. The outer tube 30 has a larger outer diameter as compared with the inner tube 30. By this arrangement, those coaxial tubes 30 can be extended or retracted with each other. However, the telescopic barrel 20 is known to the skilled in the art and not detailed description is given.

At the rear end 22 of the barrel 20, i.e. the tube 30 having the largest outer diameter, a laser module 40 and a battery 50 are mounted. A metal clip 26 is also attached to the rear end 22 of the barrel 20 by means of an insulator 261. A stopper 27 is also provided for fixing the mounting position of the laser module 40. In this embodiment, the metal clip 26 is also functioned as a switch 60, as shown in FIG. 2, when the metal clip 26 is rotated and moved toward the front end 21 of the barrel 20, it will be contacted with the battery 50. Accordingly, when the metal clip 26 is depressed and the clip tip 262 is contacted with the barrel 20 to establish a conductive loop, the power from the battery 50 is supplied to the laser module 40 and a laser beam 41 is projected from the laser module 40. It shall be noted that the axis of the laser beam 41 is coaxial with the longitudinal axis of the tube 30 and the front end 21 of the barrel 20 is provided with an opening 23. As a result, the laser beam 41 generated by the laser module 40 can be projected outward from the opening 23. On the other hand, no matter the barrel 20 is extended or retracted, the switch 60 can be used to trigger on/off of the laser beam 41.

Figure 3:
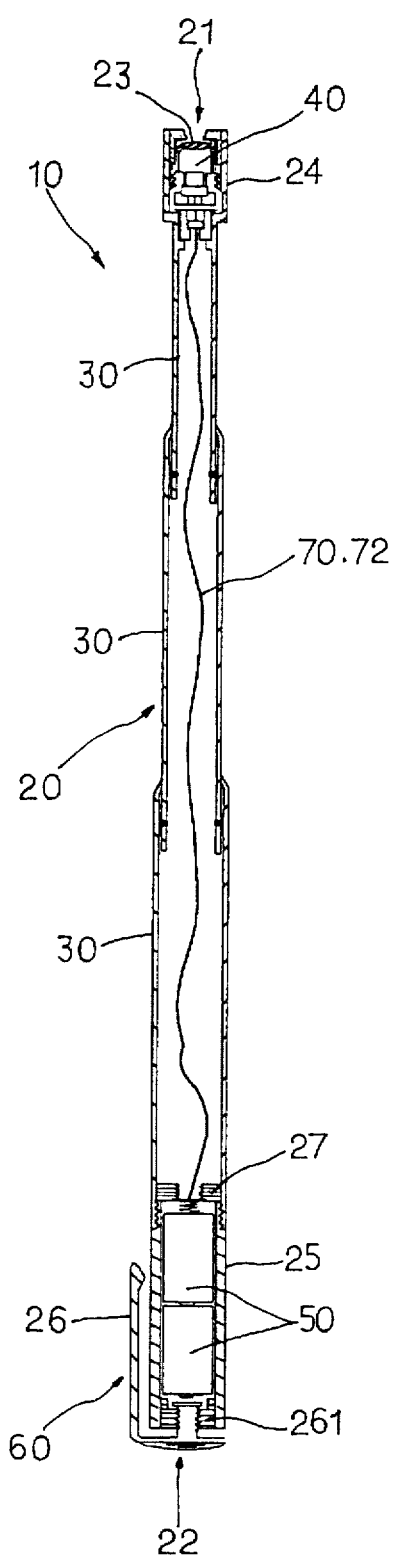
FIGS. 3 and 4 are the cross sectional views of the second embodiment of the telescopic laser pointer which are located at extended and retracted positions, respectively.
Figure 4:
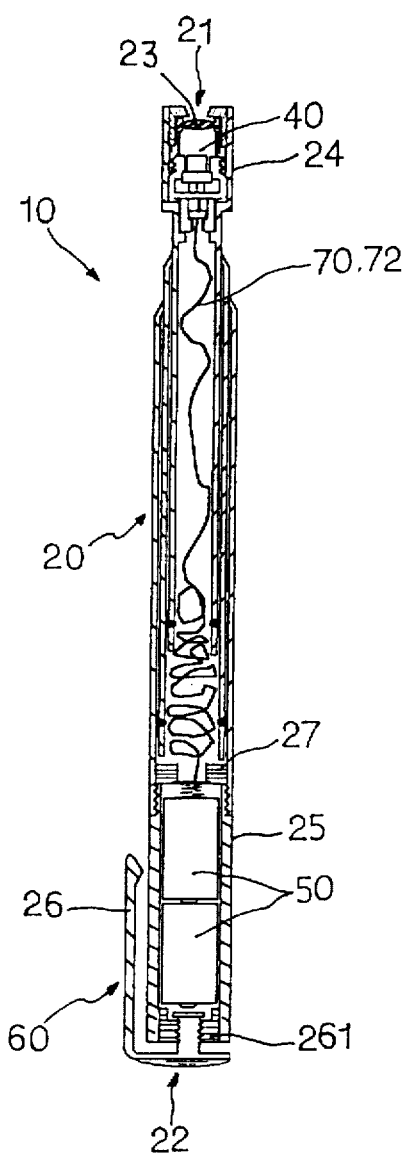

Referring to FIGS. 3 and 4, the difference between the first and second embodiments of the telescopic laser pointer is the tube 24 is fixedly attached to the front end 21 of the barrel 20 and the laser module 40 is mounted within the tube 24. In order to supply the power from the battery 50 to the laser module 40, a conductive element 70 is required and which is a conductive wire 72 in this embodiment. The conductive wire 72 may also establish a conductive loop with the barrel 20. The battery 50 is disposed between the insulator 261 and the stopper 27.

Figure 5:
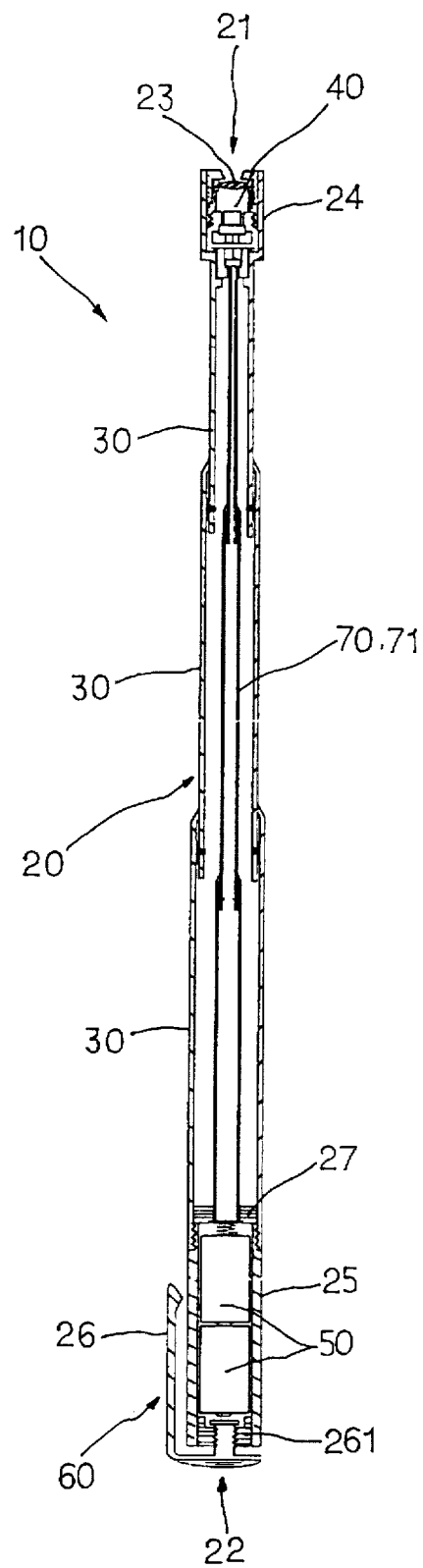
FIGS. 5 and 6 are the cross sectional views of the third embodiment of the telescopic laser pointer which are located at extended and retracted positions, respectively.
Figure 6:
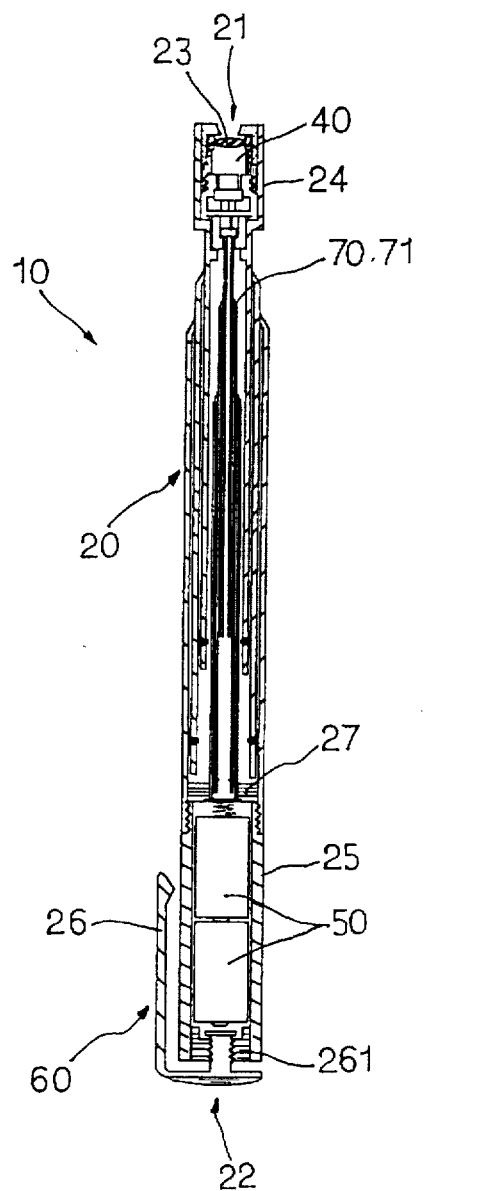

Referring to FIGS. 5 and 6, the difference between the second and third embodiments of the telescopic laser pointer is the conductive element 70 is embodied by a telescopic inner tube 71 which is made from suitable metal. The characteristic of the inner telescopic tube 71 is similar to the telescopic barrel 20. Of course, the larger outer diameter of the inner tube 71 is smaller than the smallest outer diameter of the barrel 20. On the other hand, the inner telescopic tube 71 can be reverted such that the small end is contacted with the battery 50 and the large end is contacted with the laser module 40, as shown in FIG. 10.

Figure 7:
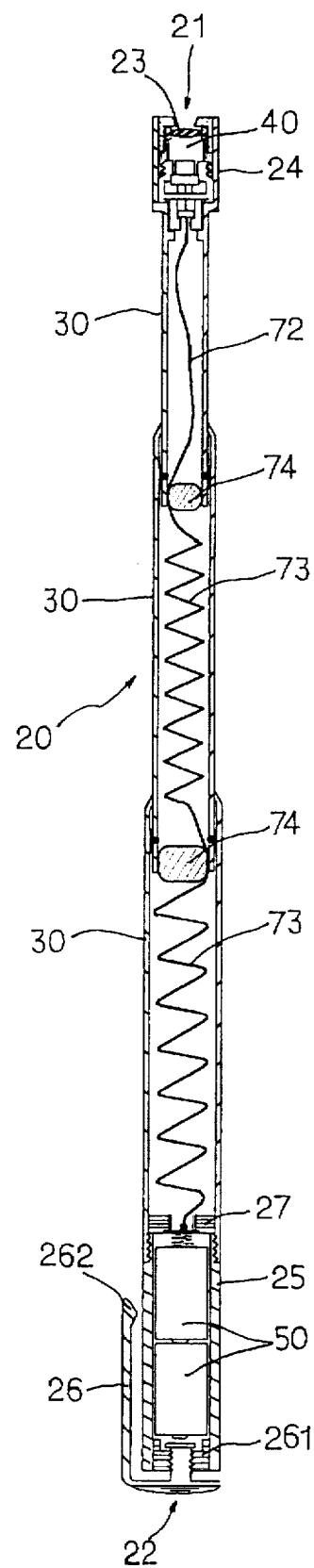
FIGS. 7 and 8 are the cross sectional views of the fifth embodiment of the telescopic laser pointer which are located at extended and retracted positions, respectively.
Figure 8:
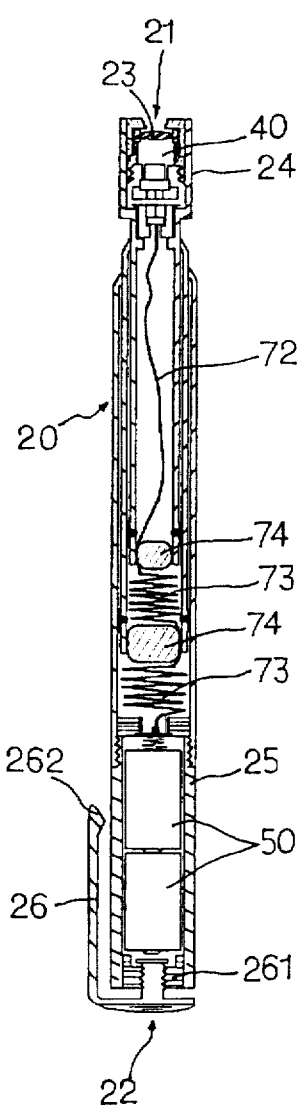

Referring to FIGS. 7 and 8, the difference between the forth and second embodiments of the telescopic laser pointer is the conductive element 70 is embodied partially by conductive wire which is spirally arranged. The end portion of the tube 30 is provided with a retaining block 74 that is used to position each sector of the spiral conductive wire. Accordingly, during the extension or retraction of the telescopic barrel 20, the spiral conductive wire 73 are snugly and neatly extended and compressed. The possible entangling of the conductive wire 72 in the second embodiment can be completely solved. Since there is no extension or retraction within the frontmost tube 30, the conductive wire 72 can be an ordinal conductive wire.

Figure 9:
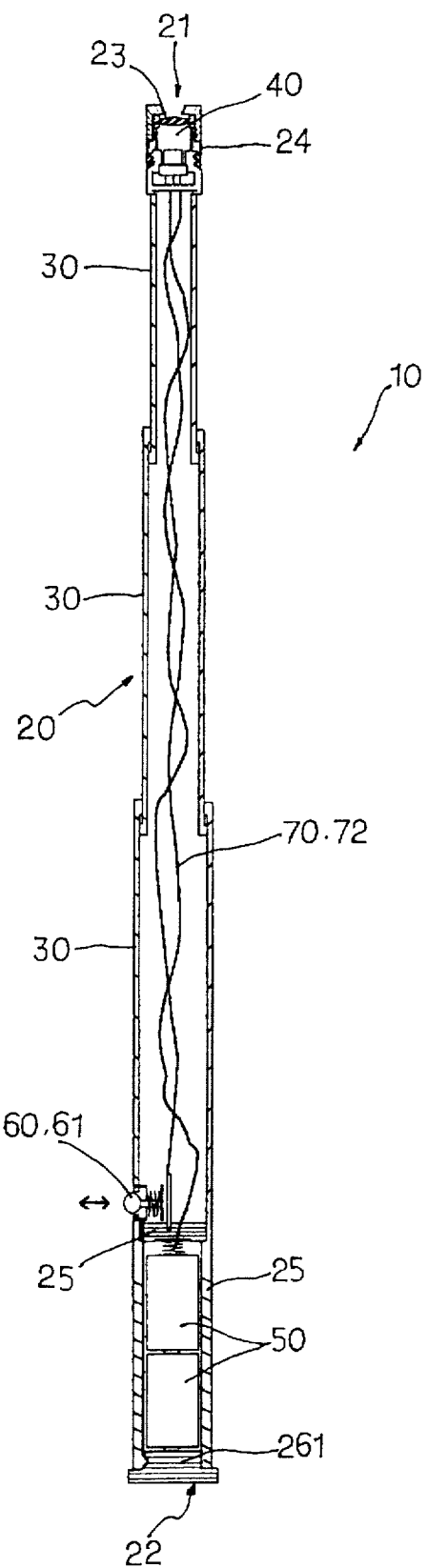
FIG. 9 is cross sectional view of the fifth embodiment of the telescopic laser pointer that is located at extended position.

FIG. 9 has disclosed the fifth embodiment of the telescopic laser pointer made according to the present invention. The difference between the fifth and second embodiments is a button-type switch 61 configures the switch 60. When the button-type switch 61 is depressed, the power from the battery 50 is supplied to the laser module 40, while when the button-type switch 61 is released, the power from the battery 50 is shut off. Besides, a pair of conductive wires 72 also configures the conductive element 70.

Figure 10:
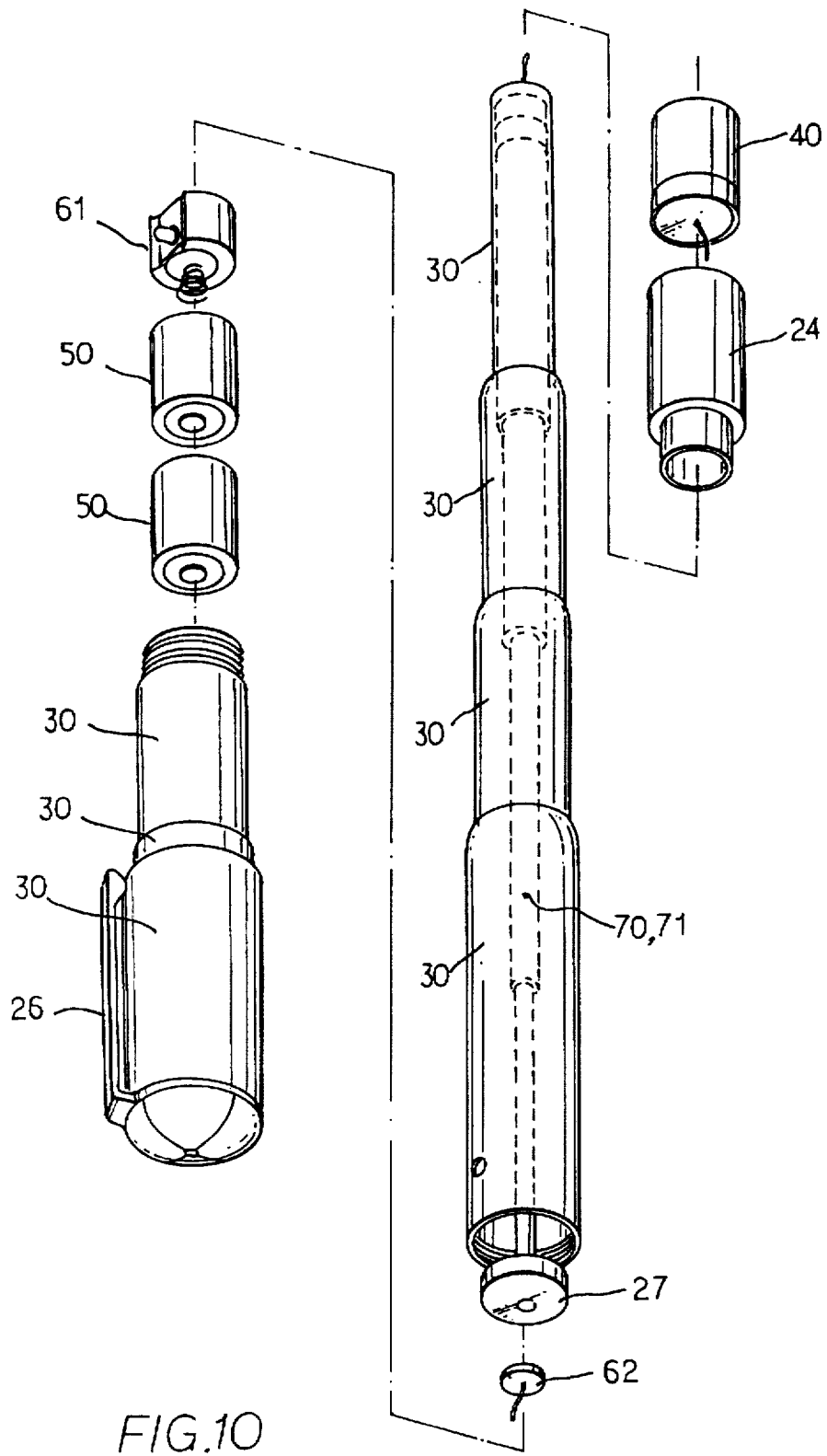
FIG. 10 is an exploded perspective view of the sixth embodiment of the telescopic laser pointer made according to the present invention.
Figures 11, 12:
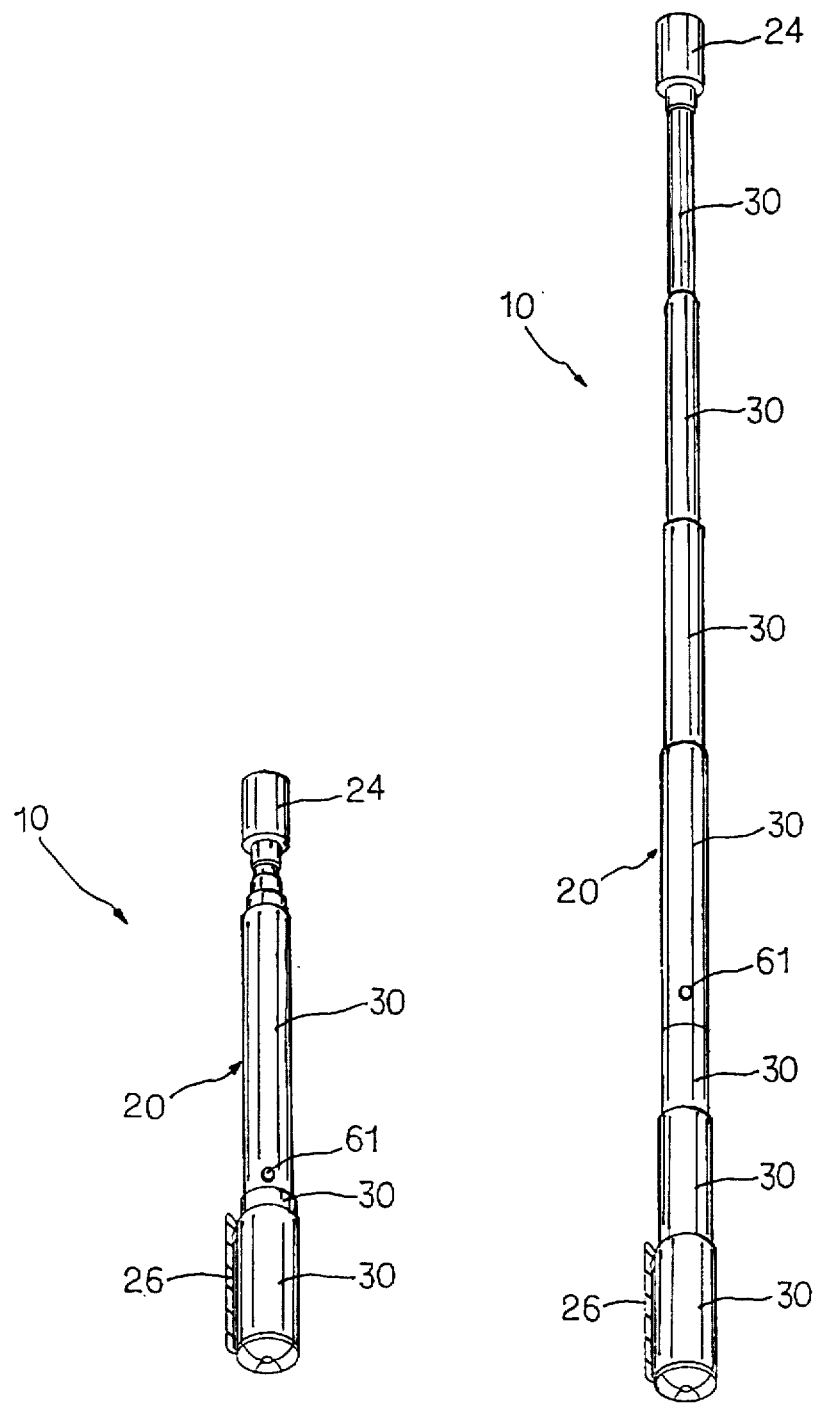
FIGS. 11 and 12 are perspective views of the sixth embodiment of the telescopic laser pointer that is located at extended and retracted positions, respectively.

Referring to FIGS. 10 and 12, the difference between the sixth and third embodiments is a button-type switch 61 is applied. On the other hand, the rear end of the reverted inner telescopic tube 71 is connected to the insulating stopper 27. A small conductive tab 62 that brings a metal wire is connected with the button-type switch 61. After the button-type switch 61, a pair of tubes 30 is enveloped thereof. By this arrangement, those two tubes 30 can be pulled backward respect to the button-type switch 61. As a result, when the user holds the rear end 22 of the telescopic barrel 20, the thumb of the user can easily manipulate the button-type It shall be noted that while particular embodiment of the present invention has been illustrated and described, it would be obvious to those skilled in the art that various other changes and modifications can be made without departing from the spirit and scope of the invention. For example, the telescopic barrel 20 can be made from other non-metal material provided the telescopic barrel 20 can be partially extended or retracted. Or, the laser module 40 and the battery 50 can be both disposed at the front end of the telescopic barrel 20. On the other hand, modification of the conductive element 70 that is located between the battery 50 and the laser module 40 or the selection of a suitable switch 60 can be readily made by the skilled in the art, it is therefore intended to cover in the appended claims all such changes and modifications that are within the scope of the present invention.

I claim:

1. A telescopic laser pointer comprising:
   a telescopic barrel defining a front end and a rear end, said frond end being provided with an opening, said telescopic barrel including a plurality of coaxial tubes that are connected and enveloped coaxially with each other, wherein the outer tube has a larger outer diameter as compared with the inner tube such that those coaxial tubes can be extended or retracted with respect to each other;
   a laser module being housed within said barrel;
   a battery being disposed within said barrel for supplying operating power to said laser module, wherein the mounting position of said battery is closer to the rear end of said telescopic barrel than that of said laser module; and
   a switch of triggering on/off of the power supplied to said laser module from said battery;
   by this arrangement, wherein when said switch is triggered on, said laser module is powered to generate a laser beam which is coaxial with the central axis of said tube, said laser beam is further projected outward from said front end of said barrel.

2. A telescopic laser pointer as recited in claim 1, wherein said battery is disposed at said rear end of said telescopic barrel.

3. A telescopic laser pointer as recited in claim 1, wherein said laser module is directly and electrically contacted with said battery.

4. A telescopic laser pointer as recited in claim 1, wherein said laser module is disposed at said front end of said telescopic barrel.

5. A telescopic laser pointer as recited in claim 1, wherein said laser module is disposed at said rear end of said telescopic barrel.

6. A telescopic laser pointer as recited in claim 1, wherein said telescopic barrel is connected with a tube in which said laser module is disposed therein.

7. A telescopic laser pointer as recited in claim 4, wherein said telescopic barrel is made from metal material.

8. A telescopic laser pointer as recited in claim 7, wherein a conductive element is provided between said laser module and said battery such that the power from said battery is supplied to said laser module through said telescopic barrel and said conductive element.

9. A telescopic laser pointer as recited in claim 8, wherein an inner telescopic tube that is made from metal material is used form said conductive element.

10. A telescopic laser pointer as recited in claim 8, wherein a conductive wire embodies said conductive element.

11. A telescopic laser pointer as recited in claim 1, wherein a pair of conductive wires is applied to connect said battery to said laser module such that the power from said battery can be supplied to said laser module.

12. A telescopic laser pointer as recited in claim 1, wherein said switch is a button-type switch.

* * * * *